Feb. 13, 1923.
P. R. FORMAN.
DOOR AND BRAKE CONTROL MECHANISM.
FILED JAN. 28, 1922.
1,445,012
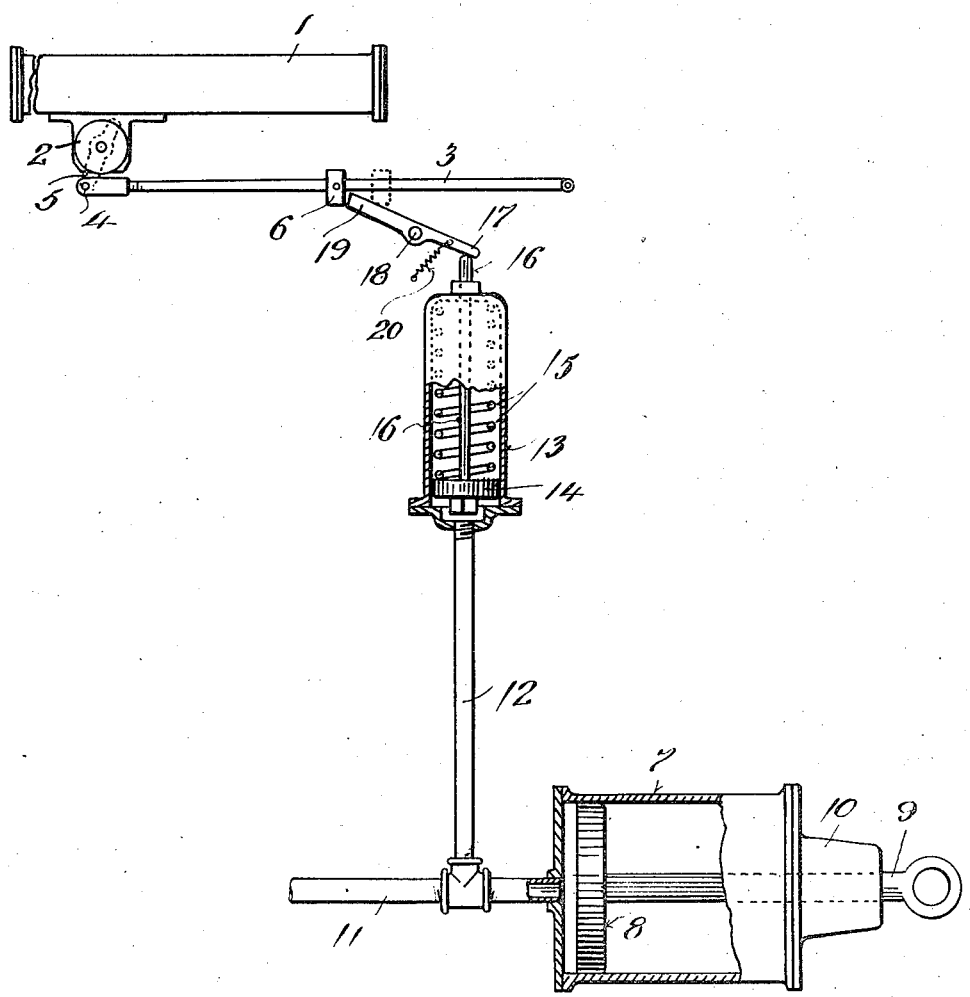

Patented Feb. 13, 1923.

1,445,012

UNITED STATES PATENT OFFICE.

PARIS R. FORMAN, OF RAHWAY, NEW JERSEY, ASSIGNOR TO NATIONAL PNEUMATIC COMPANY, OF NEW YORK, N. Y., A CORPORATION OF WEST VIRGINIA.

DOOR AND BRAKE CONTROL MECHANISM.

Application filed January 28, 1922. Serial No. 532,468.

*To all whom it may concern:*

Be it known that I, PARIS R. FORMAN, a citizen of the United States, residing at Rahway, county of Union, State of New Jersey, have made a certain new and useful Invention in Door and Brake Control Mechanism, of which the following is a specification.

This invention relates to door and brake control mechanism, and more particularly to such types of mechanism as are employed on passenger cars, such as elevated, surface, or subway trains.

The object of the invention is to provide means which are simple and efficient for controlling the door operating engine on passenger vehicles by and in accordance with the control of the fluid pressure or pneumatic brake.

A further object of the invention is to provide means which are simple and efficient for locking the door motor against operation when the brakes are released, and in consequence the car in condition to be propelled, which means also serve to release the door motor from its locked position and allow the free operation thereof to either open or close the door when the brakes are applied.

Further objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

Referring to the drawing,—

Fig. 1 is a diagrammatic view showing a brake and motor control employed in accordance with my invention.

In my co-pending application, Serial No. 496,060, filed August 27, 1921, I have shown and described an arrangement whereby the door motor is locked against operation when the brakes are released so that no control of the door motor is effected. When, however, the brakes are applied the locking means are released, whereby control of the door motor is secured. My present invention is directed to a modified arrangement for accomplishing the same purposes, and can be best understood with reference to the drawing forming a part hereof wherein the door operating motor is shown at 1. The motor is controlled in the usual manner by the valve 2, and the valve is controlled in any desired manner, for example, by means of an arm 3 pivotally connected at one end 4 to the rotary valve member 5. The parts thus far described are of standard equipment in this art, and while I have selected for illustration the particular type shown, I wish it to be understood that I do not desire to be limited or restricted in this respect, as the principles of the invention may be readily applied to any type of door motor or control. In the arrangement shown, however, I mount on the rod 3, and rigid therewith, a collar 6, which forms part of the locking mechanism hereinafter described. The brake cylinder is illustrated at 7, and is of the fluid pressure type, for example, compressed air, such as is commonly employed in the art, and consists of the cylinder in which operates the brake piston 8, the rod 9 of which extends through the cover 10 thereof and is attached to the brake device. Fluid pressure is supplied to the brake cylinder 7 through the passage 11, which passage, in accordance with my invention, is provided with an additional passage or connection 12 leading to one end of an auxiliary cylinder 13 in which operates a piston 14, which piston is normally held at one end of the cylinder by means of the coil spring 15 mounted therein around the piston rod 16. Piston rod 16 extends through the top of the cylinder 13 and bears against one end 17 of a lever which is pivoted at 18 intermediate its ends, and the other end 19 of the lever is adapted to bear against the collar 6 of rod 3. A spring 20 normally retains the levers 17 and 19 with the end 19 projected upwardly in front of the collar 6.

The operation of the device is as follows,—When the brakes are released, that is, no fluid pressure is in the brake line, the parts are in the position shown, so that the lever 17 and 19 forms in effect a pawl or locking dog bearing against the collar 6 to prevent the operation of the door motor. When, however, brake pressure is supplied through the pipe line 11 to actuate brake piston 8 in brake cylinder 7 the pressure also flows behind piston 14 raising the same against the action of spring 15 so that the piston rod 16 bears against the arm 17 of the lever to rock the same around its pivot 18, thereby withdrawing the arm 19 from in front of collar 6. As long as the brakes are applied the locking lever 17, 19, is maintained in this position, so that free operation of the motor valve may be effected. As soon, however, as the brake pressure is shut off and exhausted spring 16 forces the piston 14 to its lower position and spring 20 draws the lever 17, 19, to the position shown, whereby the motor valve is again locked against operation. It is understood that the position of the valve shown is its door closed position. By means of this arrangement it will be readily seen that I have provided an exceedingly simple structure which combines in a sense the brake and door motor control to effectively lock the door motor against operation when it is once closed when the brakes are released, which, of course, is the normal running condition of a car. When the brakes are applied of course the doors do not necessarily have to be opened, and although they are unlocked they still remain closed unless the motor valve is actuated manually or otherwise as desired.

Many modifications and changes in details will readily occur to those skilled in the art without departing from the spirit and scope of my invention as defined in the claims, but, having now set forth the objects and nature of my invention, and having shown and described a structure embodying the principles thereof, what I claim as new and useful and of my own invention, and desire to secure by Letters Patent is,—

1. The combination with a door operating motor, of means for controlling the operation of said motor, means for locking said motor controlling means against operation including a pivoted member normally in locking position, a brake mechanism, and means for rocking said pivoted member out of locking position when the brake mechanism is operated to apply the brakes.

2. The combination with a door operating motor, of means for controlling the operation of said motor, means for locking said motor controlling means against operation when the door is closed including a pivoted member normally in locking position, a brake mechanism, and means for rocking said pivoted member out of locking position when the brake mechanism is operated to apply the brakes.

3. The combination with a door operating motor, of means for controlling the operation of said motor, means for locking said motor controlling means against operation including a pivoted member normally in locking position, an air brake cylinder, and means for rocking said pivoted member out of locking position when air is supplied to said cylinder.

4. The combination with a door operating motor, of means for controlling the operation of said motor, means for locking said motor controlling means against operation when the door is closed including a pivoted member normally in locking position, an air brake cylinder, and means for rocking said pivoted member out of locking position when air is supplied to said cylinder.

5. The combination with a door operating motor, of means for controlling the operation of said motor, means for locking said motor controlling means against operation including a pivoted member normally in locking position, a brake mechanism, and means for rocking said pivoted member out of locking position when the brake mechanism is operated to apply the brakes and for maintaining said member in its rocked position as long as the brakes are applied.

6. The combination with a door operating motor, of means for controlling the operation of said motor, means for locking said motor controlling means against operation when the door is closed including a pivoted member normally in locking position, a brake mechanism, and means for rocking said pivoted member out of locking position when the brake mechanism is operated to apply the brakes and for maintaining said member in its rocked position as long as the brakes are applied.

7. The combination with a door operating motor, of means for controlling the operation of said motor, means for locking said motor controlling means against operation including a pivoted member normally in locking position, an air brake cylinder, and means for rocking said pivoted member out of locking position when air is supplied to said cylinder and for maintaining said member in its rocked position as long as the brakes are applied.

8. The combination with a door operating motor, of means for controlling the operation of said motor, means for locking said motor controlling means against operation when the door is closed including a pivoted member normally in locking position, an air brake cylinder, and means for rocking said pivoted member out of locking position when air is supplied to said cylinder and for maintaining said member in its rocked position as long as the brakes are applied.

9. The combination with a door operating motor, of means for controlling the operation of said motor, means for locking said motor controlling means against operation including a pivoted member normally in locking position, a brake mechanism, and means for rocking said pivoted member out of locking position when the brake mechanism is operated to apply the brakes, and means for returning said member to its normal position when the brakes are released.

10. The combination with a door operating motor, of means for controlling the operation of said motor, means for locking said motor controlling means against operation when the door is closed including a pivoted member normally in locking position, a brake mechanism, means for rocking said pivoted member out of locking position when the brake mechanism is operated to apply the brakes, and means for returning said member to its normal position when the brakes are released.

11. The combination with a door operating motor, of means for controlling the operation of said motor, means for locking said motor controlling means against operation including a pivoted member normally in locking position, an air brake cylinder, means for rocking said pivoted member out of locking position when air is supplied to said cylinder, and means for returning said member to its normal position when the brakes are released.

12. The combination with a door operating motor, of means for controlling the operation of said motor, means for locking said motor controlling means against operation when the door is closed including a pivoted member normally in locking position, an air brake cylinder, means for rocking said pivoted member out of locking position when air is supplied to said cylinder, and means for returning said member to its normal position when the brakes are released.

13. The combination with a door operating motor, of means for controlling the operation of said motor, means for locking said motor controlling means against operation including a pivoted member normally in locking position, a brake mechanism, means for rocking said pivoted member out of locking position when the brake mechanism is operated to apply the brakes and for maintaining said member in its rocked position as long as the brakes are applied, and means for returning said member to its normal position when the brakes are released.

14. The combination with a door operating motor, of means for controlling the operation of said motor, means for locking said motor controlling means against operation when the door is closed including a pivoted member normally in locking position, a brake mechanism, means for rocking said pivoted member out of locking position when the brake mechanism is operated to apply the brakes and for maintaining said member in its rocked position as long as the brakes are applied, and means for returning said member to its normal position when the brakes are released.

15. The combination with a door operating motor, of means for controlling the operation of said motor, means for locking said motor controlling means against operation including a pivoted member normally in locking position, an air brake cylinder, means for rocking said pivoted member out of locking position when air is supplied to said cylinder and for maintaining said member in its rocked position as long as the brakes are applied, and means for returning said member to its normal position when the brakes are released.

16. The combination with a door operating motor, of means for controlling the operation of said motor, means for locking said motor controlling means against operation when the door is closed including a pivoted member normally in locking position, an air brake cylinder, means for rocking said pivoted member out of locking position when air is supplied to said cylinder and for maintaining said member in its rocked position as long as the brakes are applied, and means for returning said member to its normal position when the brakes are released.

In testimony whereof I have hereunto set my hand on this 10th day of January A. D., 1922.

PARIS R. FORMAN.